Sept. 16, 1952  J. H. SCHMID  2,610,741
STRAINER
Filed June 17, 1950
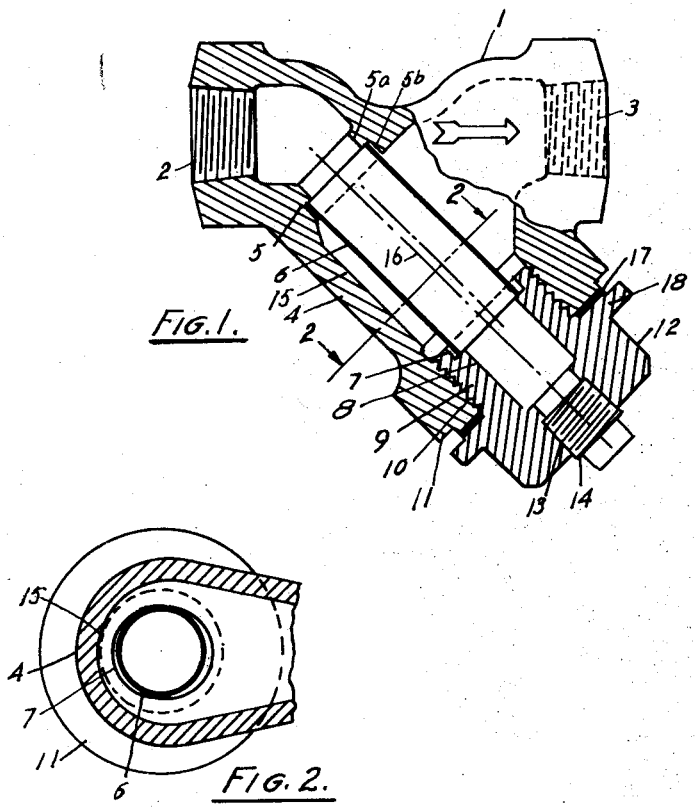
INVENTOR.
JOHN H. SCHMID
BY Patented Sept. 16, 1952

2,610,741

UNITED STATES PATENT OFFICE 2,610,741

STRAINER

John H. Schmid, Erie, Pa., assignor to J. A. Zurn Manufacturing Company, Erie, Pa., a corporation of Pennsylvania Application June 17, 1950, Serial No. 168,677

1 Claim. (Cl. 210—165)

This invention relates generally to strainers and more particularly to fittings for disposal in a pipe line with strainers mounted therein whereby the direction of flow of the fluid is changed.

All strainers of this character, made in accordance with the teachings of the prior art, and with which I am familiar, have a comparatively small area of the strainer member effectively utilized resulting in excessive pressure drops of the fluid upon passing therethrough. This excessive pressure drop impedes the flow of the fluid through the line. In these prior devices, a tapered strainer has been heretofore used, the tapered portion of the strainer fitting in tapered recesses of a plug. It has almost been impossible to determine when the strainer member is seated in these prior devices and many times the strainer remains unseated with the result that many particles pass therethrough which should have been removed from the fluid.

It is, accordingly, an object of my invention to overcome the above and other defects in strainers for disposal in a pipe line and it is more particularly an object of my invention to provide an offset strainer for a pipe line which is simple in construction, economical in cost, economical in manufacture, and efficient in operation.

Another object of my invention is to provide a novel strainer fitting having a strainer member therein offset from the axial center line thereof to permit maximum flow of fluid through the strainer and a minimum pressure drop of the fluid while passing through the strainer.

Another object of my invention is to provide novel means for inserting and seating a strainer member in an offset strainer fitting.

Other objects of my invention will become evident from the following detailed description, taken in conjunction with the accompanying drawings, in which:

Fig. 1 is a side elevational view in vertical cross section of my novel strainer; and Fig. 2 is a view taken on the line 2—2 of Fig. 1 showing the oval shaped recess in the plug for holding the strainer member upon the insertion thereof.

Referring now to the drawings, I show in Figs. 1 and 2 a strainer fitting 1 having an internally threaded inlet aperture 2 and an internally threaded outlet aperture 3 in axial alignment for attachment in a straight pipe line. An angularly extending branch 4 of the fitting 1 extends angularly outwardly away from the axis of the inlet and outlet apertures 2 and 3 thirty to forty-five degrees. A transverse wall 5 has an aperture 5a therein counterbored at 5b in the upper end of the branch 4 to seat the upper end of a cylindrical shaped foraminous strainer 6, the bottom of the strainer 6 seating in an oval shaped counterbore 7 in the upper end of a recess 8 in a threaded plug 9. The threaded plug 9 threadably engages the internally threaded portion 10 of an enlarged lower end 11 of the branch 4 of the fitting 1. The plug 9 has a flattened wrench engaging portion 12 for receiving a wrench. The plug 9 also has a central, internally threaded bore 13 for receiving a threaded cleanout plug 14 or blow-down line (not shown) for cleaning the dirt strained from the fluid passing through the strainer member 6 and deposited in the strainer 6 and in the recess 8 in the plug 9. The internal wall 15 of the branch 4 is spaced from the strainer member 6 to permit fluid to pass outwardly from all sides of the strainer member 6. The center line 16 of the strainer member 6 is offset from the axial center line of the passageway in the branch 4 of the fitting 1 so that a greater space will be provided between the strainer 6 and the inner wall 15 of the branch 4 for the passage of fluid therethrough thereby minimizing the pressure drop caused by the straining member 6. The offsetting of the straining member 6 provides a maximum passage of fluid through the fitting 1 and a minimum impedance to the flow of fluid therethrough. A sealing gasket 17 is provided between the flanged portion 18 of the plug 9 and the end of the branch 4.

In operation, fluid passes through the fitting 1 in the direction of the arrow. The fluid passes downwardly through the offset strainer member 6 and outwardly therefrom to the outlet aperture 3 in the fitting 1. The offsetting of the strainer member 6 permits a greater amount of fluid to pass through the strainer member 6 with a comparatively low pressure drop of the fluid inasmuch as there is a progressive widening of the passageway around the strainer in the direction of flow of fluid proportional to the increase in the quantity of fluid around the strainer toward the outlet aperture 3.

In strainers of this type, the strainer member 6 must be removed and replaced at comparatively frequent intervals. My strainer member 6 is cylindrical in shape with ends so that one end thereof may be squeezed into the oval shaped counterbore 7 in the plug 9 before the insertion thereof in the branch 4 of the fitting 1 and held therein. The plug 9 with the strainer member 6 held therein is then threadably engaged with the threaded portion 10 of the enlarged end 11 of the branch 4 of the fitting 1 and the upper end thereof automatically seats in the annular counterbore 5b in the wall 5 thereby assuring a good tight fit of the strainer member 6 so that all fluid coming into the inlet aperture 2 passes through the strainer member 6 before it reaches the outlet aperture 3. Cleanout plug 14 or a blow line is provided to clean out the material strained from the fluid at any predetermined interval.

It will be evident from the foregoing description that I have provided a novel strainer fitting for disposal in a pipe line which has a strainer member therein angularly offset from the axis of the inlet aperture in the fitting, which has a branch leading off from the inlet aperture and in fluid flow relationship therewith, a strainer in the branch with the center line thereof offset in a direction opposite to the flow of fluid to increase the effective area of the strainer member for the passage of fluid therethrough thereby minimizing pressure drop in the strainer member and minimizing impedance to the flow of fluid through the strainer fitting, which has efficient cleanout means, and which has novel means for inserting a strainer member in the strainer fitting.

Various changes may be made in the specific embodiment of my invention without departing from the spirit thereof or from the scope of the appended claim.

What I claim is:

A strainer member comprising a cylindrical body with a laterally extending inlet and outlet in axial alignment with each other, a wall between said inlet and outlet and extending transversely of said body having an axially offset, counterbored, vertically extending aperture, said aperture being offset from the axis of said cylindrical body in the direction of said inlet, a cylindrical apertured strainer member having the upper end thereof seated in said counterbore in said wall, a removable plug axially aligned with the offset aperture in said wall having a bore with an oval shaped counterbore for seating the opposite end of said strainer member, the plug counterbore being oval in shape in a plane transverse of the axis of the plug, the minor axis of the oval plug counterbore being less than the diameter of the strainer and the major axis of the oval plug counterbore being greater than the diameter of the strainer whereby a wedging action results between the oval plug counterbore and the strainer.

JOHN H. SCHMID.

REFERENCES CITED

The following references are of record in the file of this patent:

UNITED STATES PATENTS

| Number | Name | Date |
|---|---|---|
| 1,273,656 | Paget | July 23, 1918 |